J. SALES.
HAY LIFTING AND CARRYING DEVICE.
APPLICATION FILED OCT. 17, 1914.
1,151,052.
Patented Aug. 24, 1915.
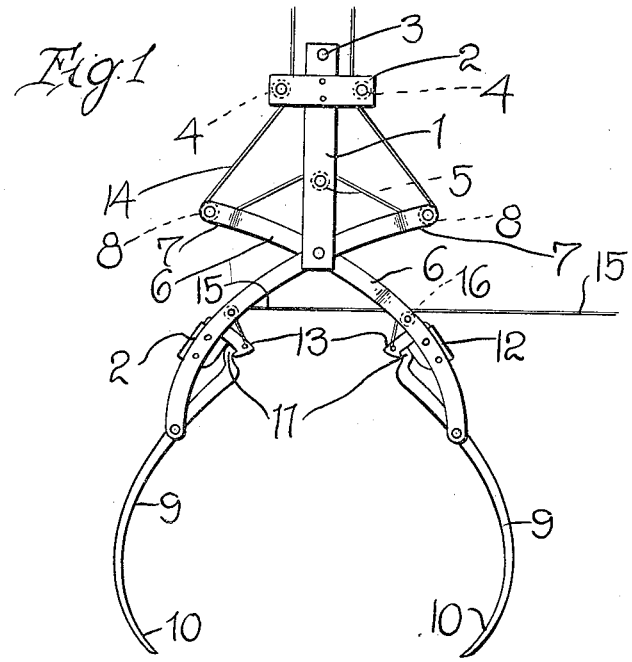
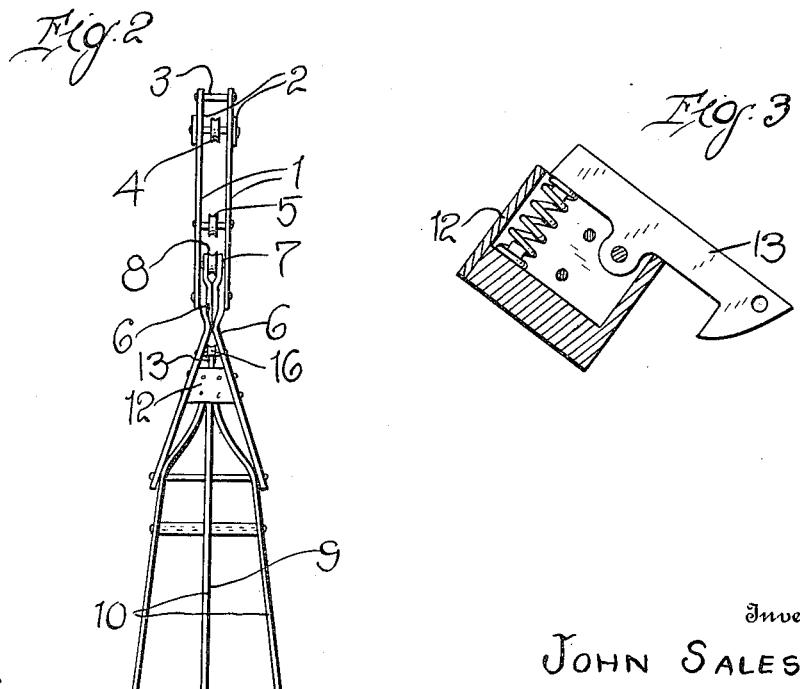
Inventor
JOHN SALES

UNITED STATES PATENT OFFICE.

JOHN SALES, OF IGNACIO, COLORADO.

HAY LIFTING AND CARRYING DEVICE.

1,151,052.  Specification of Letters Patent.  Patented Aug. 24, 1915.

Application filed October 17, 1914. Serial No. 867,181.

*To all whom it may concern:*

Be it known that I, JOHN SALES, a citizen of the United States, residing at Ignacio, in the county of La Plata and State of Colorado, have invented certain new and useful Improvements in Hay Lifting and Carrying Devices, of which the following is a specification, reference being had to the accompanying drawings.

This invention relates to new and useful improvements in hay forks, and particularly to that class of hay forks which are adapted for use in connection with derricks or the like to stack hay, or carry the same from place to place.

An object of this invention is the provision of a hay carrying device in which the forks thereof are automatically closed when the device is lifted from the ground.

A further object of this invention is the provision of a hay lifting and carrying device, in which the hay forks are normally held in closed position by latches, means being provided the latches from engagement with the forks so that the same automatically open to drop the hay at any desired point.

With these and other objects in view, my invention consists in the novel construction, combination, and arrangement of parts, to be hereinafter more fully described, claimed, and illustrated in the accompanying drawing, in which—

Figure 1 is a side elevational view of my device; Fig. 2 is an edge elevational view thereof; and Fig. 3 is a fragmentary sectional view showing the manner of supporting one of the latch members.

Referring more particularly to the drawing, the device consists of a carrying member which includes a pair of spaced parallel vertical bars 1, and secured to the outer face of each bar 1 adjacent its upper end is a cross bar 2, the cross bars projecting beyond the opposite side edges of the vertical bar. Connected to the bars 1 at their upper ends is a rod 3, and supported between the ends of the cross bars 2 are pulleys 4, a pulley 5 being also mounted between the vertical bars 1 intermediate of their ends.

Pivotally mounted between the lower ends of the vertical bars 1 are a pair of crossed pivotally connected levers 6, each of the levers consisting of a pair of parallel bars which are spaced apart at their upper ends to provide arms 7 between which pulleys 8 are mounted, the pulleys 8 being arranged in substantially transverse alinement with the pulley 5. The lower ends of the bars of each pair of levers are gradually spaced apart, and pivotally mounted adjacent its upper end between the lower ends of the bars of each lever is a fork 9.

Each fork comprises a plurality of tines 10 which are gradually spaced apart from their upper ends to their lower ends, the upper ends of the tines being secured against each other, and being provided with inwardly extending lugs 11. Mounted between the bars of the levers 6 in transverse alinement with the upper ends of the forks 9 are brackets 12 which carry spring pressed inwardly extending latches 13, which are adapted for engagement with the lugs 11 to hold the forks in operative position. A lifting cable 14 is adapted for connection at its ends to a suitable hoisting apparatus (not shown) the stretches of the cable extending downwardly between the cross bars 2 to engage against the pulleys 4, the cable thence extending between the arms 7 of the levers to engage the pulleys 8, and the cable also passing over the pulley 5 carried between the arms 1, so that when a strain is applied to the lifting cable, the levers will be closed by the engagement of the cable against the upper ends of the levers, whereby the hay disposed between the forks will be compressed therebetween during the lifting and the carrying of the device. It will be seen that the forks are prevented from spreading apart at their lower ends by the engagement of the latches 13 with the lugs 11, and to release the latches from the forks, a pair of strip cables 15 are connected at their ends to the free ends of the latches 13, the cables 15 being passed around pulleys 16 carried between the bars of the levers above the latches, whereby upon a pull on the trip cables, the latches will be raised from engagement with the upper ends of the forks so that the same may be opened to drop the hay compressed therebetween.

Having thus fully described my invention, what I desire to secure by Letters Patent is:

1. In a hay fork, a pair of pivotally united levers, a tine pivotally connected to the lower end of each lever, and means for securing the tines against swinging movement, said means including a bracket secured to a lever, a spring pressed pawl carried by the bracket, said pawl being adapted to engage with the terminal of the tine for holding the same against the bracket whereby the tine is held against swinging movement in both a clockwise and counter-clockwise direction, and means for releasing the pawl, whereby the tine may swing freely with respect to the lever.

2. In a hay fork, a pair of crossed, pivotally united levers, a tine pivotally connected to the lower terminal of each lever, and means carried by each lever for locking the tine thereof against swinging movement in both a clockwise and counter-clockwise direction, said means including a bracket fixed to the lever, a pawl pivoted to the bracket, a spring arranged within the bracket and bearing against the pawl for normally holding the same in position, a lug formed on the tine, said lug being adapted for engagement by the pawl whereby the lug is held against the bracket, and means for releasing the pawl, whereby the tine may swing freely with respect to the lug.

In testimony whereof I hereunto affix my signature in the presence of two witnesses.

JOHN SALES.

Witnesses:
F. BINDER,
JESSIE M. CAMPBELL.

Copies of this patent may be obtained for five cents each, by addressing the "Commissioner of Patents, Washington, D. C."